April 27, 1965  J. C. NASH  3,179,976
APPARATUS FOR STRETCHING WEBS
Filed Sept. 5, 1962  4 Sheets-Sheet 1

INVENTOR.
JOHN CRANDON NASH
BY
William Frederich Werner
ATTORNEY

April 27, 1965  J. C. NASH  3,179,976
APPARATUS FOR STRETCHING WEBS
Filed Sept. 5, 1962  4 Sheets-Sheet 2
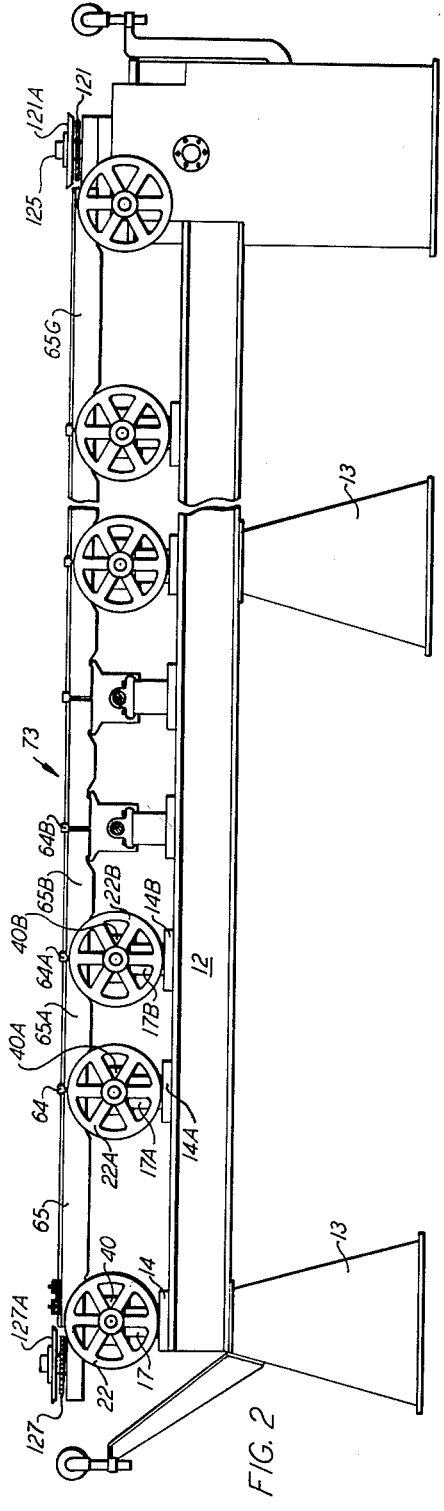
FIG. 2
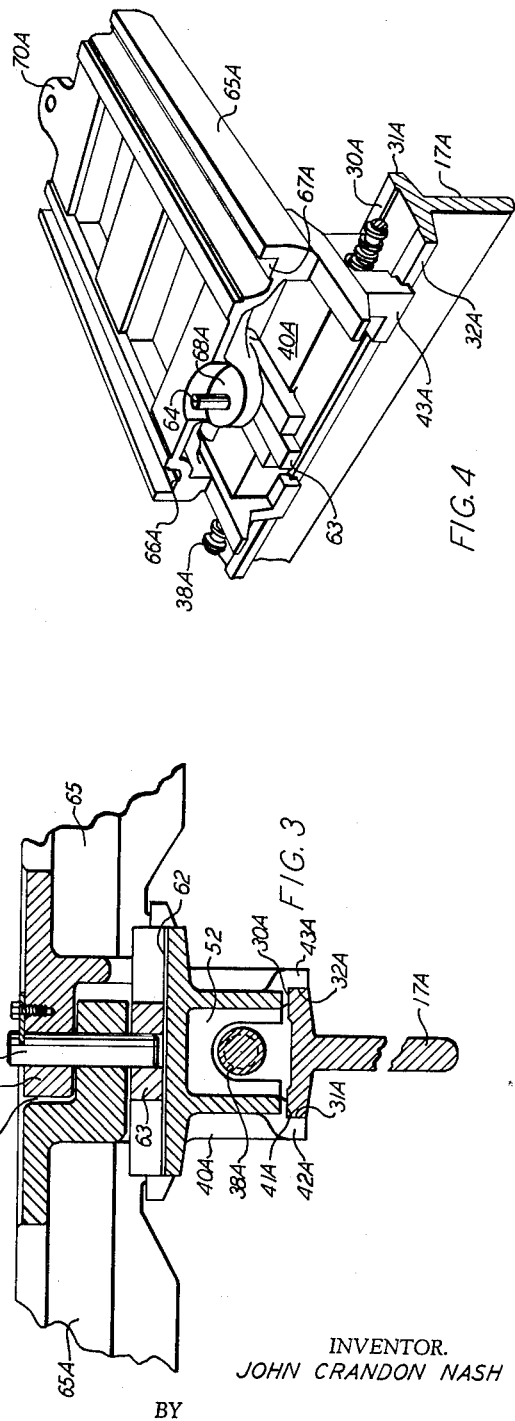
FIG. 4
FIG. 3
INVENTOR.
JOHN CRANDON NASH
BY
William Frederick Werner
ATTORNEY April 27, 1965     J. C. NASH     3,179,976
APPARATUS FOR STRETCHING WEBS
Filed Sept. 5, 1962     4 Sheets-Sheet 3
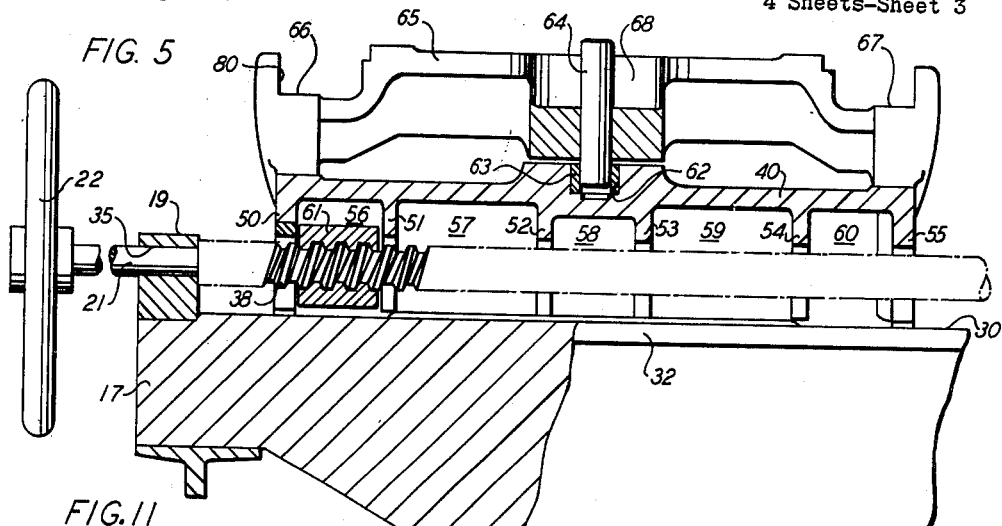
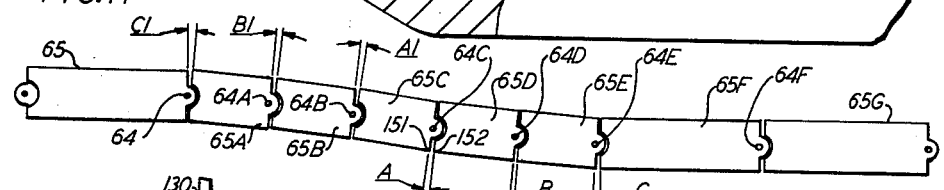
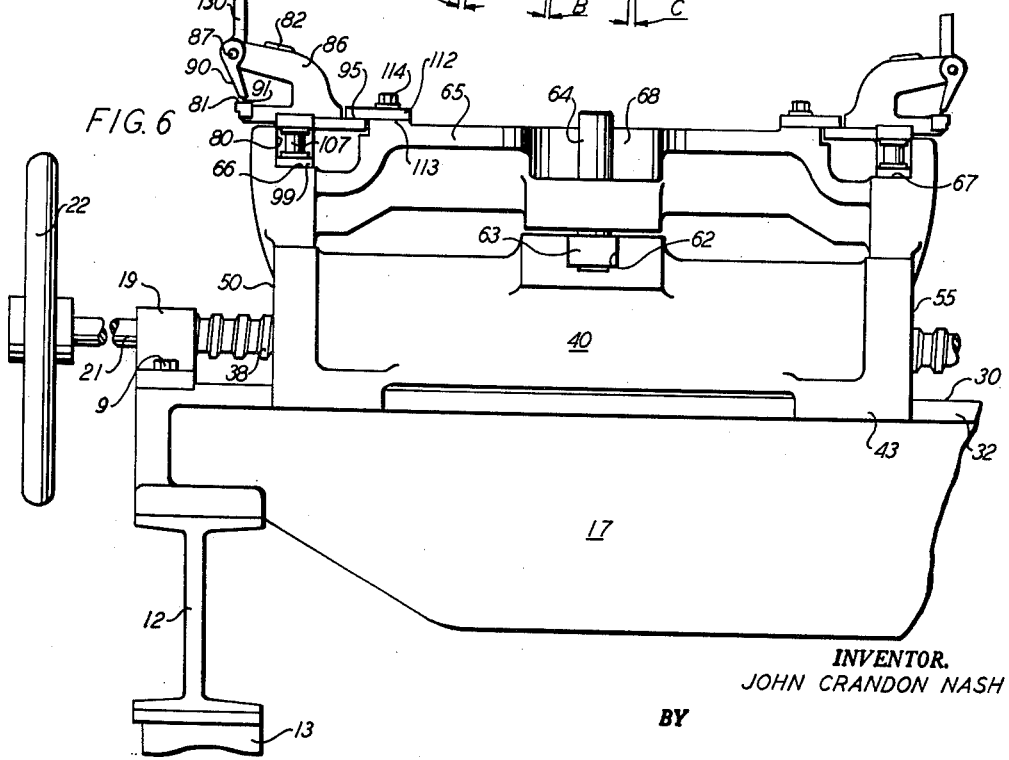
INVENTOR.
JOHN CRANDON NASH
BY
William Frederick Werner
ATTORNEY April 27, 1965   J. C. NASH   3,179,976
APPARATUS FOR STRETCHING WEBS
Filed Sept. 5, 1962   4 Sheets-Sheet 4
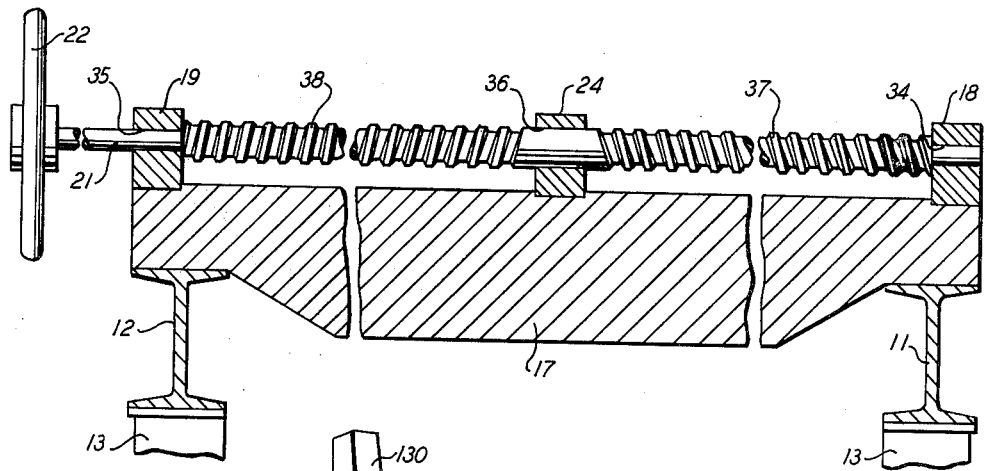
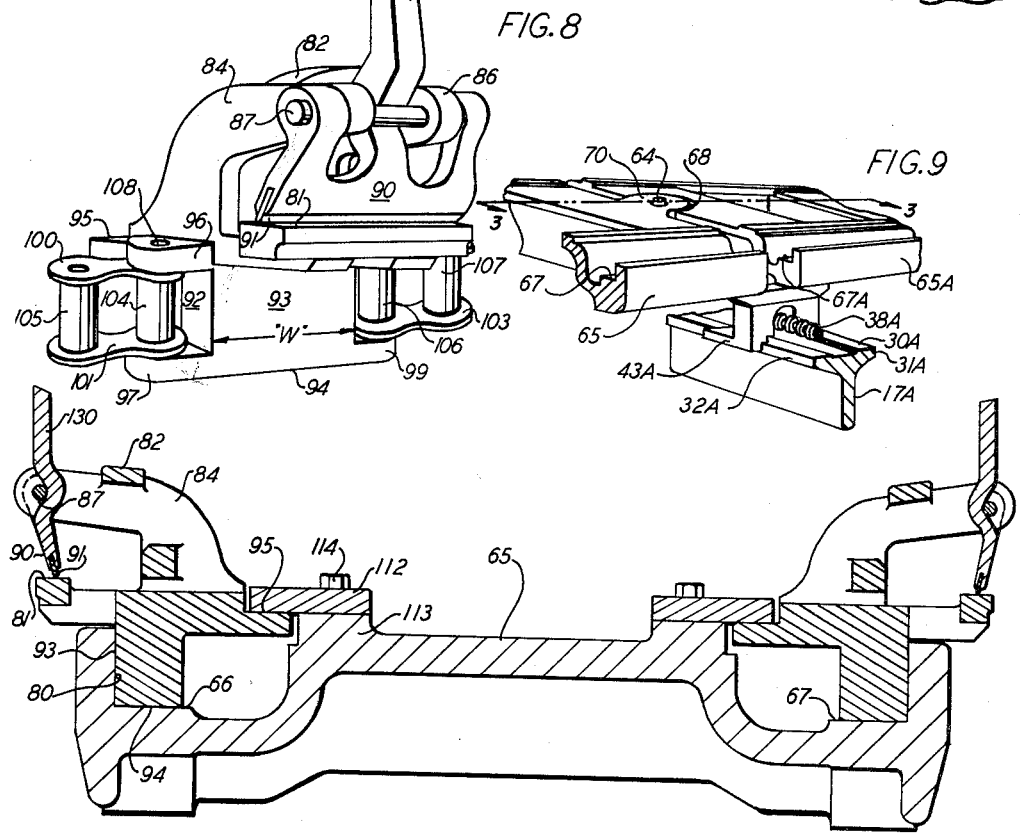
INVENTOR.
JOHN CRANDON NASH
BY
William Frederick Werner
ATTORNEY

United States Patent Office 3,179,976
Patented Apr. 27, 1965

3,179,976
APPARATUS FOR STRETCHING WEBS
John Crandon Nash, Providence, R.I., assignor to Marshall and Williams Corporation, Providence, R.I., a corporation of Rhode Island
Filed Sept. 5, 1962, Ser. No. 221,558
6 Claims. (Cl. 18—1)

This invention relates to apparatus for stretching webs and films and more particularly it relates to a tentering machine for laterally stretching thermoplastic film to increase its width and to reduce the web thickness.

An object of the present invention is to provide an apparatus for stretching webs of thermoplastic film laterally within a smooth, reverse curve tract while gripping the film along opposite edges by means of tenter clips.

Another object of the present invention is to provide adjustable apparatus in the nature of a tentering frame for varying the path of travel of tentering clips.

In the past, a tenter frame was used to grip cloth on opposite edges and move the cloth in a horizontal plane through an oven, or an enclosure for moistening or drying the continuous web of material.

Within recent years there has been developed a need to handle a continuous sheet or web of plastic film in order to stretch the film sidewise or laterally to increase the lateral area of the film while uniformly reducing the thickness of the film. Thermoplastic film presents a stretching problem because the film must be maintained in a plastic state during the stretching operation. The problem of stretching the thermoplastic is magnified due to the high coefficient of friction of such material while in the plastic state. And still another problem presented in stretching thermoplastic film is to avoid localized stretching which produces thin spots in the web material. Uneven stretching is imparted by shock or bumps of the tenter clips in the travel of the tenter clips and film through the tentering machine.

Accordingly, it is an object of the present invention to provide an improved apparatus which will stretch thermoplastic film in the plastic state.

A further object of the present invention is to provide apparatus whereby the amount of lateral stretching can be regulated to very close tolerances.

And still a further object of the present invention is to provide apparatus which carries a thermoplastic film in the plastic state through a smooth curve and uniform rate of travel during the stretching operation.

With these and other objects in view, this invention consists in certain novel features of construction, combination and arrangement of parts to be hereinafter more fully described and claimed.

Referring to the drawing in which similar characters of reference indicate corresponding parts:

FIGURE 2 is a right side elevational view partly in section taken along line 2—2 of FIGURE 1.

FIGURE 3 is a fragmentary sectional vertical view taken on line 3—3 of FIGURE 9.

FIGURE 4 is a fragmentary perspective view of a section of the tentering machine rail showing the mechanism for adjusting the rail.

FIGURE 5 is a fragmentary vertical cross sectional view taken on line 5—5 of FIGURE 1 with the adjacent section omitted.

FIGURE 6 is an end view of FIGURE 4 with the side frame and hand wheel added.

FIGURE 7 is a vertical sectional view taken on line 7—7 of FIGURE 1 with the rail structure left off.

FIGURE 8 is a perspective view of a tenter clip.

FIGURE 9 is a fragmentary perspective view of the connection between two rail sections.

FIGURE 10 is a vertical sectional view through a tenter clip and rail illustrating the relationship of the tenter clip to the rail.

FIGURE 11 is a diagrammatic view illustrating the relative position the divergent guide rail sections take in relation to one another in forming a reverse curve.

Figure 1:
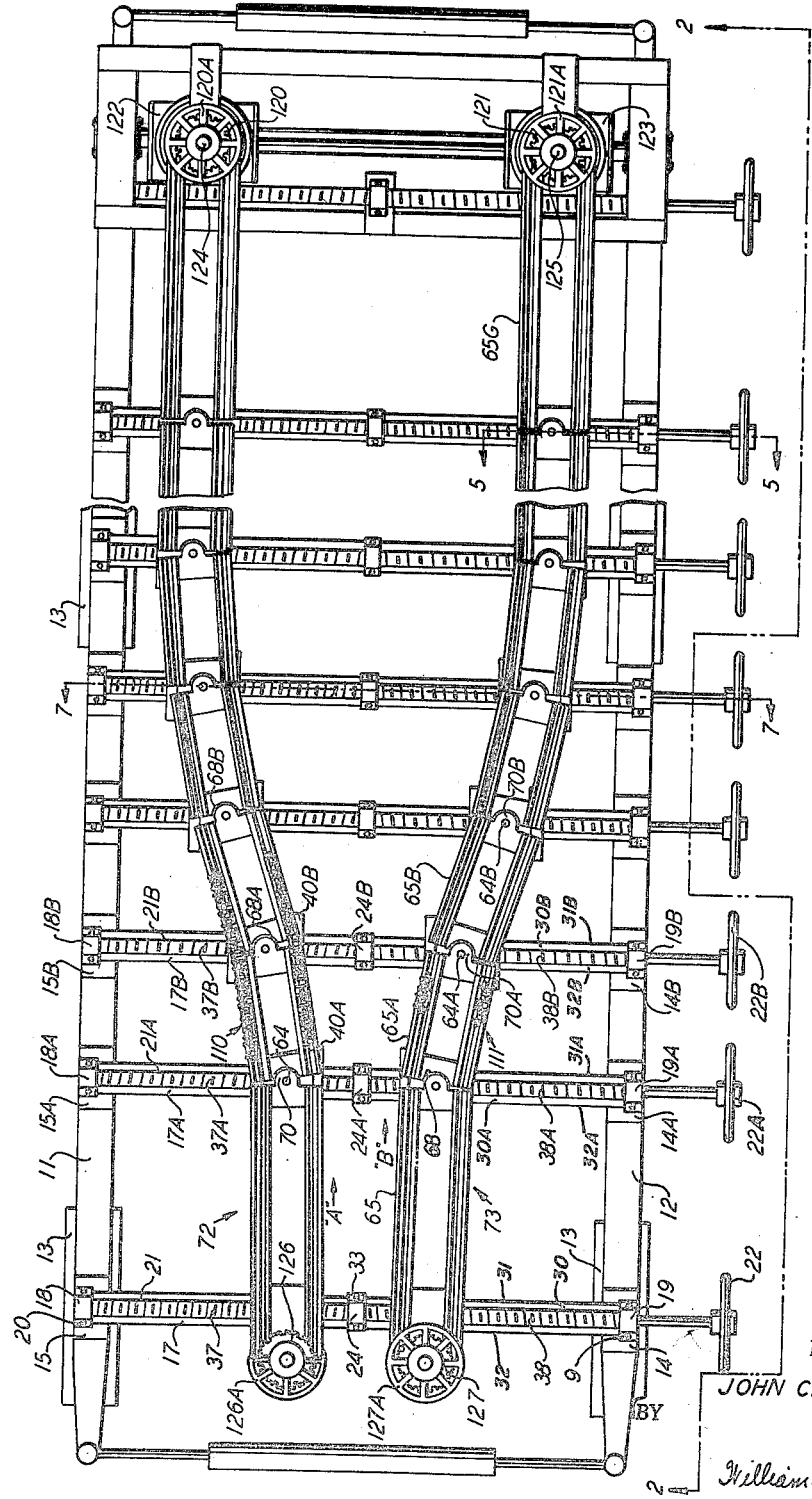
FIGURE 1 is a plan view of the apparatus for stretching thermoplastic film.

In proceeding with this invention, reference is made to the drawings, wherein is illustrated a modified form of tentering frame. The apparatus illustrated consists of a left side frame 11 and a right side frame 12 which are in the form of "I" beams.

A plurality of legs or standards 13 are fixed to left and right side frames 11 and 12, respectively, as by welding, to support said frames 11, 12 at a preselected or waist level.

A plurality of cross members 17, 17A, 17B, etc., are fastened, by means of welding, to pads 14, 14A, 14B, etc., respectively, on one end and to pads 15, 15A, 15B, etc., respectively, on the other end. Each cross member 17, 17A, 17B, etc., is machine finished to provide a track consisting of a top 30 and opposite sides 31, 32 for purposes which will presently appear. Pads 14, 14A, 14B, etc., are fastened along right side frame 12, by means of welding. Pads 15, 15A, 15B, etc., are fastened along left side frame 11 by means of welding.

A plurality of bearings 18, 18A, 18B, etc., are adapted to engage tops 30, 30A, 30B, etc., respectively, and grip opposite sides 31, 32; 31A, 32A; 31B, 32B, etc., respectively, over left side frame 11. Bolts 20 fasten bearings 18, 18A, 18B, etc., to cross members 17, 17A, 17B, etc., respectively. A corresponding plurality of bearings 19, 19A, 19B, etc., are adapted to engage tops 30, 30A, 30B, etc., respectively, and grip opposite sides 31, 32; 31A, 32A; 31B, 32B, etc., respectively, over right side frame 12. Bolts 9 fasten bearings 19, 19A, 19B, etc., to cross members 17, 17A, 17B, etc., respectively.

A plurality of center bearings 24, 24A, 24B, etc., engage cross members 17, 17A, 17B, etc., respectively, in a manner described for bearings 18 and 19. Bolts 33 fasten bearings 24, 24A, 24B, etc., respectively, to cross members 17, 17A, 17B, etc., respectively.

A plurality of shafts 21, 21A, 21B, etc., are provided with bearing surfaces 34, 35, 36 which are rotatively mounted in bearings 18, 19 and 24, respectively. Shaft 21, 21A, 21B, etc., are provided with a right hand thread 37, 37A, 37B, etc., respectively, and a left hand thread 38, 38A, 38B, etc., respectively, for purposes which will presently appear.

A plurality of hand wheels 22, 22A, 22B, etc., are fastened to one end of shafts 21, 21A, 21B, etc., respectively, for the manual rotation thereof.

A plurality of saddles 40, 40A, 40B, are provided with sliding faces 41, 41A, 41B, etc., and sliding ends 42, 43; 42A, 43A; 42B, 43B, etc., respectively, to slidingly engage tops 30, 30A, 30B, etc., respectively, and opposite sides 31, 32; 31A, 32A; 31B, 32B, etc., respectively.

The construction of saddle 40 will be described. It will be understood that saddles 40A, 40B, etc., are identical in construction.

Saddle 40 is provided with a plurality of inverted U shaped projections 50, 51, 52, 53, 54, and 55 which form chambers 56, 57, 58, 59 and 60. Inverted U shaped projections 50, 51, 52, 53, 54 55 straddle shaft 21 to allow shaft 21 to freely rotate. A nut 61 provided with a screw thread of a hand adapted to rotatively engage left hand thread 38 is located in chamber 56 and is held therein by means of inverted U shaped projections 50, 51.

Rotation of hand wheel 22 causes nut 61 to engage either inverted U-shaped projection 50 or 51 to slide saddle 40 upon cross member 17 toward or away from bearing 19.

Saddle 40 is provided with a longitudinal groove 62. A block 63 is slidably mounted in longitudinal groove 62. A pivot pin 64 is fastened in block 63.

A plurality of rail members 65, 65A, 65B, etc., are provided with tenter clip tracks 66, 67; 66A, 66B, 67B, etc., respectively, and pivotal recesses 68, 68A, 68B, etc., respectively, on one end and pivotal tongues 70, 70A, 70B, etc., respectively, on the opposite end. Pivotal tongues 70, 70A, 70B, etc., are adapted to pivotally engage pivot pins 64, 64A, 64B, etc., respectively, and lie in the respective pivotal recess. In this manner a continuous left side and a continuous right side rail member is provided as generally indicated by reference characters 72, 73, respectively.

The diagrammatic view, FIGURE 11, shows that the straight guide rail members or sections at the sheet-receiving region 65 and at the sheet-discharging region 65F, 65G may constitute one or more individual straight guide rail members or sections of a length normally greater than the length of the intermediate divergent straight guide rail members or sections.

The apparatus will provide an infinite variety of curves. However, two types of curves are in general use. The hour glass or milk bottle contour curve, narrow at the neck and widening out. The reverse curve of equal and opposite contours.

In the hour glass curve the number of divergent straight guide rail sections may constitute an odd or an even number.

In the reverse curve the divergent straight guide rail sections constitute an odd number. FIGURE 1 illustrates the hour glass curve. FIGURE 11 illustrates the reverse curve. FIGURE 1 shows that the pair of straight guide rail sections 65, 65G, may be adjusted out of parallel relation but for purposes of illustration FIGURE 11, assumes the straight guide rail sections to be in a parallel relation.

In the reverse curve path illustrated in FIGURE 11, the adjacent or intermediate divergent guide rail Sections 65B, 65D form equal but opposite angles, angles A, A1, with the middle section and that the next adjacent or end divergent guide rail Sections 65A, 65E form equal but opposite angles, angles B, B1, with the intermediate sections and with the straight sections, angles C, C1. That is angles A and A1 are equal and opposite. Angles B and B1 are equal and opposite but are not necessarily equal to angles A and A1. Angles C and C1 are equal and opposite and if more divergent guide rail sections are employed they too would form equal and opposite angles with their counterpart in the adjacent divergent guide rail sections. It will be noted that angles A, B and C lie on one side of middle divergent guide rail section and angles A1, B1 and C1, lie on the opposite side. Thus the divergent guide rail sections produce a reverse curve path or track for the travel of the tenter clip chain.

The distance between edges 151, 152 of any two divergent guide rail sections can never equal or exceed dimension "W" FIGURE 8 or the width of clip face 93 because clip face 93 must always contact side case 80 and be guided thereby. If the distance between edges 151, 152 is too great, clip face 93 will bump or jar and put a permanent ridge in the plastic sheet in the plasticized state. The tenter clip track 66, by way of example, comprises a side case 80, and a chain race indicated by the reference numeral 66. A tenter clip, one of a plurality forming a tentering chain is illustrated in FIGURE 8, and comprises a horizontally disposed base 81, a vertically upstanding body 82 and a pair of arms 84, 86 which project sidewise from body 82 to overlie base 81. Pivotally mounted between arms 84, 86 on a pintle 87 is a jaw 90. Between the lower edge 91 of jaw 90 and base 81, the cloth (not shown) is gripped as the tenter clip forming part of the tenter chain moves along the tracks 66, 67;

66A, 67A; etc., of the rail members 65, 65A, 65B, etc. Base 81 is provided with a depending arm 92 having a clip face 93, a clip bottom 94, and a clip tail 95. Base 81 is provided with the usual roller chain connecting ears 96, 97 and 99. A roller chain connected on either side to base 81 comprises roller links 100, 101 and 103 secured to spacing sleeves 104, 105 and 106, 107 respectively. Pintles 108, pivotally connect spacing sleeves 104, 106 to connecting ears 96, 97 and 99, respectively. This assembly of roller links and spacing sleeves is pivotally connected to adjacent roller links and spacing sleeves by a pair of connecting links secured to axial pins which extend through the spacing sleeves 105, 107. In this manner a complete tenter clip chain is formed. The tenter clip chains are fragmentarily illustrated in FIGURE 1 and are generally indicated by reference characters 110 and 111.

The tenter clip (FIGURES 6 and 10) is held in the tenter clip tract 66 by means of a top case 112 which is secured to the rail raiser 113 by means of screws 114. Rail raiser 113 is part of rail member 65. Clip face 93 slidingly engages side case 80. Clip bottom 94 slidingly engages chain race 66 and clip tail 95 slidingly engages top case 112.

The tentering frame is provided with two driving sprockets 120, 121, driven by motors 122, 123 by means of shafts 124, 125, respectively, and two driven sprockets 126, 127. Tentering chain 110 is operatively connected to sprockets 120, 126. Tentering chain 111 is operatively connected to sprockets 121, 127. Tentering chains 110 and 111 rotate in the direction of arrows "A" and "B," respectively.

In operation the rotation of tenter chains 110, 111 in rail members 72, 73, respectively, carry the web to be stretched from the pick up end or sheet receiving region of the tentering frame between sprockets 126, 127 to the delivery end or sheet discharging region of the tentering frame between sprockets 120, 121. Suitable cams 120A, 121A engage upstanding arms 130 of the pivoted jaws 90 causing lower edges 91 to swing away from bases 81 and disengage the cloth (not shown). At the sheet-receiving region cams 126A, 127A engage arms 130 to pivot jaws 90 away from bases 81. As arms 130 of tenter clip chains 110, 111 move in the direction of arrows A and B, the arms 130 disengage cams 126A, 127A to release pivoted jaws 90 to the action of gravity to grip the cloth between bases 81 and lower edges 91.

Rotation of hand wheels 22, 22A, 22B, etc., cause the respective saddles 40, 40A, 40B, etc., to slide upon cross members 17, 17A, 17B, etc., whereby the rail members 65, 65A, 65B, etc., and their tenter clip tracks 66, 67, 66A, 67A, 66B, 67B, etc. are moved in relation one to the other to provide a preselected path of movement for the respective tenter clip chains 110, 111. That preselected path is under very close tolerance adjustment due to threads 37, 38, 37A, 37B, etc., on shafts 21, 21A, etc. respectively. FIGURES 1, 9 and 11 clearly illustrate a gap or space between adjacent divergent guide rail members; 65, 65A, for example. This gap must permit clip face 93 to pass from one guide rail member to the adjacent divergent guide rail member, i.e., from tenter clip track 67 to tenter clip track 67A, smoothly and without the slightest jar or vibration or the plastic film in the plastic state will have imparted to it, a wrinkle, a ridge or a tear.

By way of example and not limitation, it has been found that divergent guide rail sections each constituting one complete endless track and each comprising seven straight rail sections can be adjusted to stretch a plastic web in a ratio of five to one in ten feet while the tenter clip chains travel simultaneously at the rate of one hundred feet per minute.

Having shown and described a preferred embodiment of the present invention, by way of example, it should be realized that structural changes could be made and

What I claim is:

1. An apparatus for stretching webs comprising a frame, standards supporting said frame, a plurality of cross members secured to said frame, a plurality of bearings, three for each cross member, fastened to the ends and the center of each cross member, a plurality of shafts, one for each cross member, each shaft having a right hand thread section, a left hand thread section and a medial bearing area, said shafts rotatively mounted in said plurality of bearings with said medial bearing area located in the bearing fastened to the center of the cross member, a plurality of hand wheels, means fastening a hand wheel to each of said plurality of shafts, a plurality of saddles two for each cross member, a plurality of nuts, one for each saddle, a nut secured in each saddle, one nut slidably mounting one saddle to a cross member and to a right hand thread section, another nut secured in another saddle slidably mounting the last mentioned saddle to the last mentioned cross member and to the left hand thread section of the same shaft whereby rotation of the shaft in one direction draws the saddles toward each other and rotation of the shaft in an opposite direction separates said saddles, a plurality of expansion blocks one for each saddle, means slidably mounting an expansion block in each saddle, a plurality of pivot pins, one for each expansion block, means fastening a pivot pin in each expansion block, a plurality of rails, means pivotally mounting the end of one rail to the end of the adjacent rail through said pivot pins, thereby to provide two pivotally connected adjacent longitudinal tenter clip rails, the individual end rails being longer than the individual rails located between the end rails, the rails intermediate the end rails being short whereby adjacent rails of short straight section produce a path of smooth curvature between adjacent tenter clip rails, said shafts providing incremental adjustment between pairs of rails controlled by the same shaft and incremental adjustment between adjacent rails, the saddles intermediate the end rails comprising an old number, a plurality of tenter clips, means uniting said plurality of tenter clips into two tentering chains, one tenter chain slidably mounted in one longitudinal tenter clip rail and the other tenter chain slidably mounted in the other of the two longitudinal tenter clip rails and means to rotate the two tenter clip chains at uniform speed and in the path determined by adjacent saddles.

2. Apparatus for stretching webs comprising a frame having a left hand section and a right hand section, a plurality of cross members secured on opposite ends to said left hand section and said right hand section, respectively, a plurality of shafts, one for each cross member, means rotatively mounting said shafts to said cross members, each shaft having a left hand thread and a right hand thread, a plurality of saddles, two for each cross member, means connecting one saddle to the left hand thread and means connecting another saddle to the right hand thread of the same shaft to slidably mount said two saddles to the same cross member for movement toward and away from each other, a plurality of expansion blocks, one for each saddle, means slidably mounting an expansion block in each saddle, a plurality of pivot pins, one for each expansion block, means fastening said pivot pins in said expansion blocks, a plurality of rail members, means pivotally connecting the rail members to each other through said pivot pins to form two adjacent longitudinal tenter clip paths, slidably mounted upon saddles, the rail members comprising straight sections of such length to produce a reverse curve path under control of said plurality of shafts, a plurality of tenter clips, means uniting said plurality of tenter clips into two endless tentering chains, one for each longitudinal tenter clip path, and means to rotate the two endless tentering chains in the respective longitudinal tenter clip paths.

3. Apparatus for stretching webs comprising a frame, a plurality of cross members fastened to said frame, a plurality of shafts, one for each cross member, bearing means secured to said cross members rotatively mounting said shafts to said cross members, each shaft having a left hand thread and a right hand thread, a plurality of saddles, two for each cross member, nut means provided in each saddle, said saddles divided into two groups, one group of saddles being connected to the left hand threads through said nut means, and the other group of saddles being connected to the right hand threads through said nut means to provide two saddles slidably mounted on each cross member for movement toward and away from each other through rotation of the same shaft, a plurality of expansion blocks, one for each saddle, means slidably mounting said plurality of expansion blocks in said plurality of saddles, a plurality of pivot pins, one for each expansion block, means fastening said plurality of pivot pins in said plurality of expansion blocks, a plurality of rail members, each rail member having a tenter clip guide surface, means pivotally connecting the rail members to each other through said pivot means whereby the tenter clip guide surfaces form continuous tenter clip paths, each rail member being slidably mounted upon opposite ends upon a saddle, the rail members comprising straight sections of such length to produce curved tenter clip paths, said shafts controlling the contour of said paths through said saddles, expansion blocks, pivot pins and rail members, a plurality of tenter clips, means connecting said plurality of tenter clips into two endless tentering chains, one for each tenter clip path, and means to rotate the two endless tentering chains at the same speed in the respective tenter clip path.

4. Apparatus for transversely stretching a running sheet of material comprising two pairs of tenter clip endless chains movable in substantially parallel relation for simultaneously frictionally gripping both edges of the sheet, divergent guide rails for the tenter clip endless chains defining a sheet-receiving region between the closer ends of the guide rails and a sheet-discharging region between the other ends thereof, the divergent guide rails comprising a multiplicity of an odd number of straight guide rail sections of such length to produce a reverse curve path for the tenter clip endless chains for transversely stretching the sheet, the divergent guide rails being complementarily ridged and grooved in a longitudinal direction for limiting movement of each tenter clip endless chain to the path defined by its respective guide rail, and means for automatically controlling the opening and closing of said tenter clips to engage and release the edges of the sheet at the sheet-receiving region and sheet-discharging region, respectively, and means for providing incremental adjustments to the multiplicity of odd number of straight rail sections, individually.

5. Apparatus for transversely stretching a running sheet of plastic film in a plasticized state, comprising two pairs of tenter clip endless chains movable in substantially parallel relation for simultaneously frictionally gripping both edges of a sheet of plastic film, two opposite and parallel guide rail sections defining a sheet of plastic film receiving region at one end of the apparatus, and two opposite and parallel guide rail sections defining a sheet of plastic film discharging region at the other end of the apparatus, two divergent guide rail sections between said receiving region and said discharging region, each divergent guide rail section comprising five independent straight articulated divergent guide rail sections, each section of which is no greater than one fifth the distance between said parallel guide rail, sections defining a sheet of plastic film receiving region and said parallel guide rail sections defining a sheet of plastic film discharging region, to produce a smooth, jar proof reverse curve path for the travel of the tenter clip endless chains whereby to transversely stretch the sheet of plastic film in a plasticized state, the parallel and divergent guide rail sections being complementarily ridged and grooved in a longitudinal direction for limiting movement of each tenter clip endless chain to the path defined by its respective guide rail.

6. Apparatus for transversely stretching a running sheet of plastic film in a plasticized state, comprising two pairs of tenter clip endless chains movable in substantially parallel relation for simultaneously frictionally gripping both edges of a sheet of plastic film, two pairs of opposite and parallel guide rail sections, one pair for each tenter clip endless chain, defining a sheet of plastic film receiving region at one end of the apparatus, two pairs of opposite and parallel guide rail sections, one pair for each tenter clip endless chain, defining a sheet of plastic film discharging region at the other end of the apparatus, two pairs of divergent guide rail sections, one pair for each tenter clip endless chain, between said receiving region and said discharging region, each of said pairs of divergent guide rail sections comprising in a span of ten feet no less than five independent straight articulated divergent guide rail sections, each section of which is no greater than one fifth the distance between said parallel guide rail sections defining a sheet of plastic film receiving region and said parallel guide rail sections defining a sheet of plastic film discharging region, to produce a smooth, jar proof reverse curve path for the travel of the tenter clip endless chains whereby to transversely stretch the sheet of plastic film in a plasticized state, the parallel and divergent guide rail sections being complementarily ridged and grooved in a longitudinal direction for limiting movement of each tenter clip endless chain to the path defined by its respective guide rail.

References Cited by the Examiner
UNITED STATES PATENTS

| | | | |
|---|---|---|---|
| 2,729,874 | 1/56 | Creary | 26—61 |
| 2,923,966 | 2/60 | Tooke et al. | 18—1 |
| 3,066,377 | 12/62 | Waterman. | |

WILLIAM J. STEPHENSON, *Primary Examiner.*